US012187105B2

(12) United States Patent
Gorby et al.

(10) Patent No.: US 12,187,105 B2
(45) Date of Patent: Jan. 7, 2025

(54) VEHICULAR SLIDER DOOR HANDLE WITH INTERNAL DETENT MECHANISM

(71) Applicant: Magna Mirrors of America, Inc., Holland, MI (US)

(72) Inventors: Brett A. Gorby, Rockford, MI (US); James E. Niemiec, Grand Rapids, MI (US)

(73) Assignee: Magna Mirrors of America, Inc., Holland, MI (US)

( * ) Notice: Subject to any disclaimer, the term of this patent is extended or adjusted under 35 U.S.C. 154(b) by 619 days.

(21) Appl. No.: 17/450,695

(22) Filed: Oct. 13, 2021

(65) Prior Publication Data

US 2022/0111709 A1    Apr. 14, 2022

Related U.S. Application Data

(60) Provisional application No. 63/203,202, filed on Jul. 13, 2021, provisional application No. 63/198,363, filed on Oct. 14, 2020.

(51) Int. Cl.
  *E05C 19/00* (2006.01)
  *B60J 5/04* (2006.01)
  *B60J 5/06* (2006.01)
  *E05B 85/12* (2014.01)

(52) U.S. Cl.
  CPC ............. *B60J 5/0468* (2013.01); *B60J 5/06* (2013.01); *E05B 85/12* (2013.01)

(58) Field of Classification Search
  CPC .......... E05B 85/12; E05B 85/10; E05B 1/003; E05B 1/0053; E05B 15/0053; E05B 2001/0076; E05B 13/002; E05B 13/004; E05B 13/106; E05B 13/108
  See application file for complete search history.

(56) References Cited

U.S. PATENT DOCUMENTS

| | | | |
|---|---|---|---|
| 3,153,553 A * | 10/1964 | Sandor | E05B 85/14 292/DIG. 31 |
| 3,738,202 A * | 6/1973 | Nielsen | B25B 23/00 81/90.4 |
| 6,036,257 A * | 3/2000 | Manuel | E05D 15/1081 49/213 |
| 7,887,202 B1 | 2/2011 | Peterson | |
| 9,487,142 B2 | 11/2016 | Sobecki et al. | |
| 2020/0223364 A1 | 7/2020 | Peterson et al. | |
| 2020/0353867 A1 | 11/2020 | Huizen et al. | |
| 2022/0258672 A1 | 8/2022 | Peterson et al. | |
| 2023/0211740 A1 | 7/2023 | LaCross et al. | |

* cited by examiner

*Primary Examiner* — Michael P Ferguson
*Assistant Examiner* — Thomas L Neubauer
(74) *Attorney, Agent, or Firm* — HONIGMAN LLP

(57) ABSTRACT

A vehicular slider door handle assembly includes a base portion configured for mounting at a vehicular slider door, a handle pivotally mounted at the base portion and pivotable between a neutral position and a door opening position, and a detent mechanism. The detent mechanism releasably retains the handle relative to the base portion at the neutral position. With the base portion mounted at the vehicular slider door, the handle is pivotable about a pivot axis of the detent mechanism, and as the handle pivots about the pivot axis via actuation by a person at the vehicular slider door, the detent mechanism allows the handle to pivot from the neutral position toward the door opening position without axially moving the handle away from the base portion.

10 Claims, 15 Drawing Sheets

VEHICULAR SLIDER DOOR HANDLE WITH INTERNAL DETENT MECHANISM

CROSS REFERENCE TO RELATED APPLICATIONS

The present application claims the filing benefits of U.S. provisional application Ser. No. 63/203,202, filed Jul. 13, 2021, and U.S. provisional application Ser. No. 63/198,363, filed Oct. 14, 2020, which are hereby incorporated herein by reference in their entireties.

FIELD OF THE INVENTION

The present invention relates to door handles for vehicles and, more particularly, to a door handle for a slider door of a vehicle, such as a van or a mini-van or the like.

BACKGROUND OF THE INVENTION

It is known to provide a slider door at the side of a vehicle. Typically, a handle is disposed inside the vehicle that a user can grasp and pull to release a door latch and open the slider door or to actuate a powered slider mechanism that opens the door.

SUMMARY OF THE INVENTION

A vehicular slider door handle assembly comprises a base portion configured for mounting at an interior side of a vehicular slider door, an interior handle pivotally mounted at the base portion, and a detent mechanism. The detent mechanism releasably retains the interior handle at a neutral position. With the base portion mounted at the interior side of the vehicular slider door, the interior handle is pivotable about a pivot axis of the detent mechanism. As the interior handle pivots about the pivot axis, the detent mechanism allows the interior handle to pivot without axially moving the interior handle away from the base portion. The detent mechanism also functions to urge the handle back to the neutral position when released by the user.

These and other objects, advantages, purposes and features of the present invention will become apparent upon review of the following specification in conjunction with the drawings.

DESCRIPTION OF THE PREFERRED EMBODIMENTS

Figure 1:
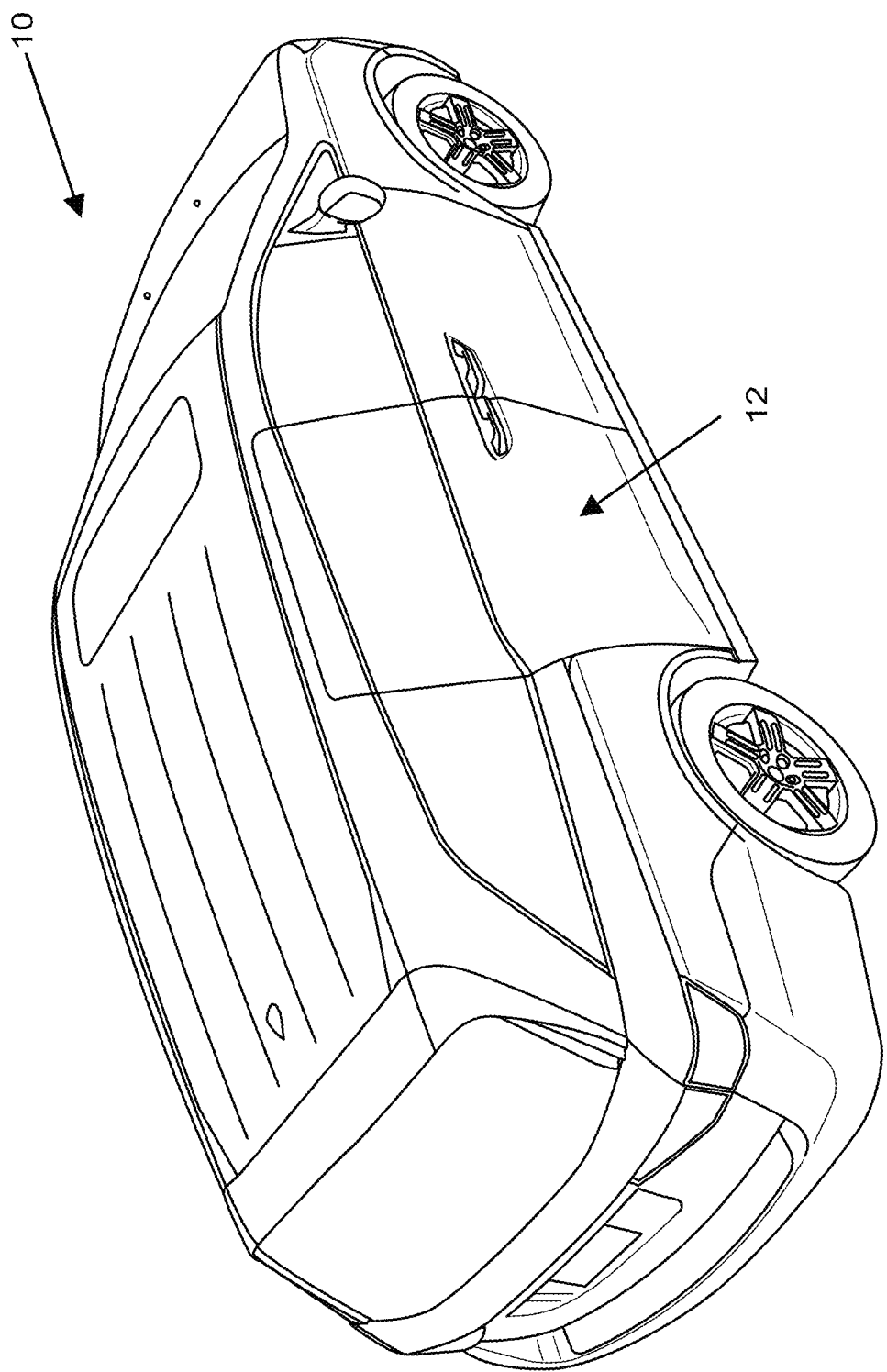
FIG. 1 is a perspective view of a vehicle equipped with a slider door handle assembly and mechanism.
Figure 2:
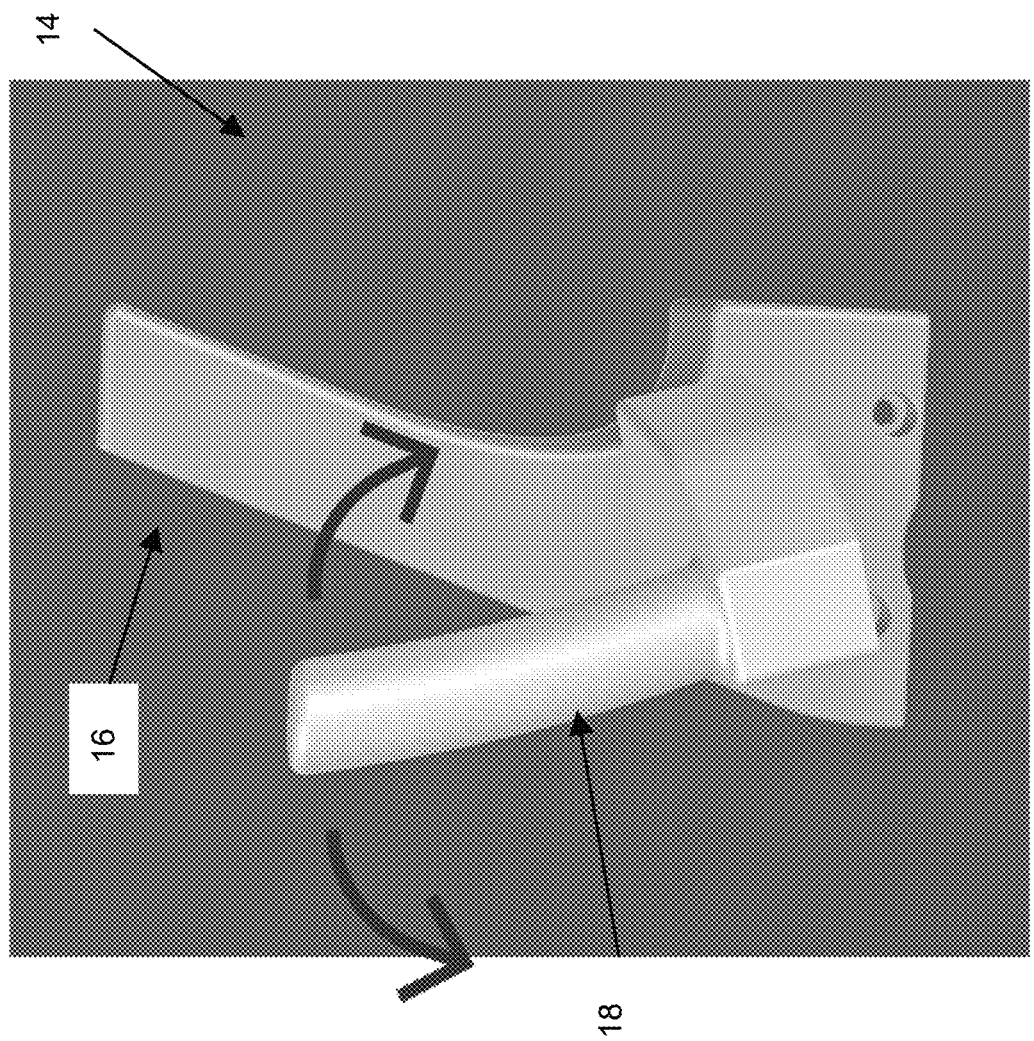
FIG. 2 is an interior perspective view showing an interior handle of the slider door handle assembly as it pivots relative to a base portion of the slider door handle assembly.
Figure 3:
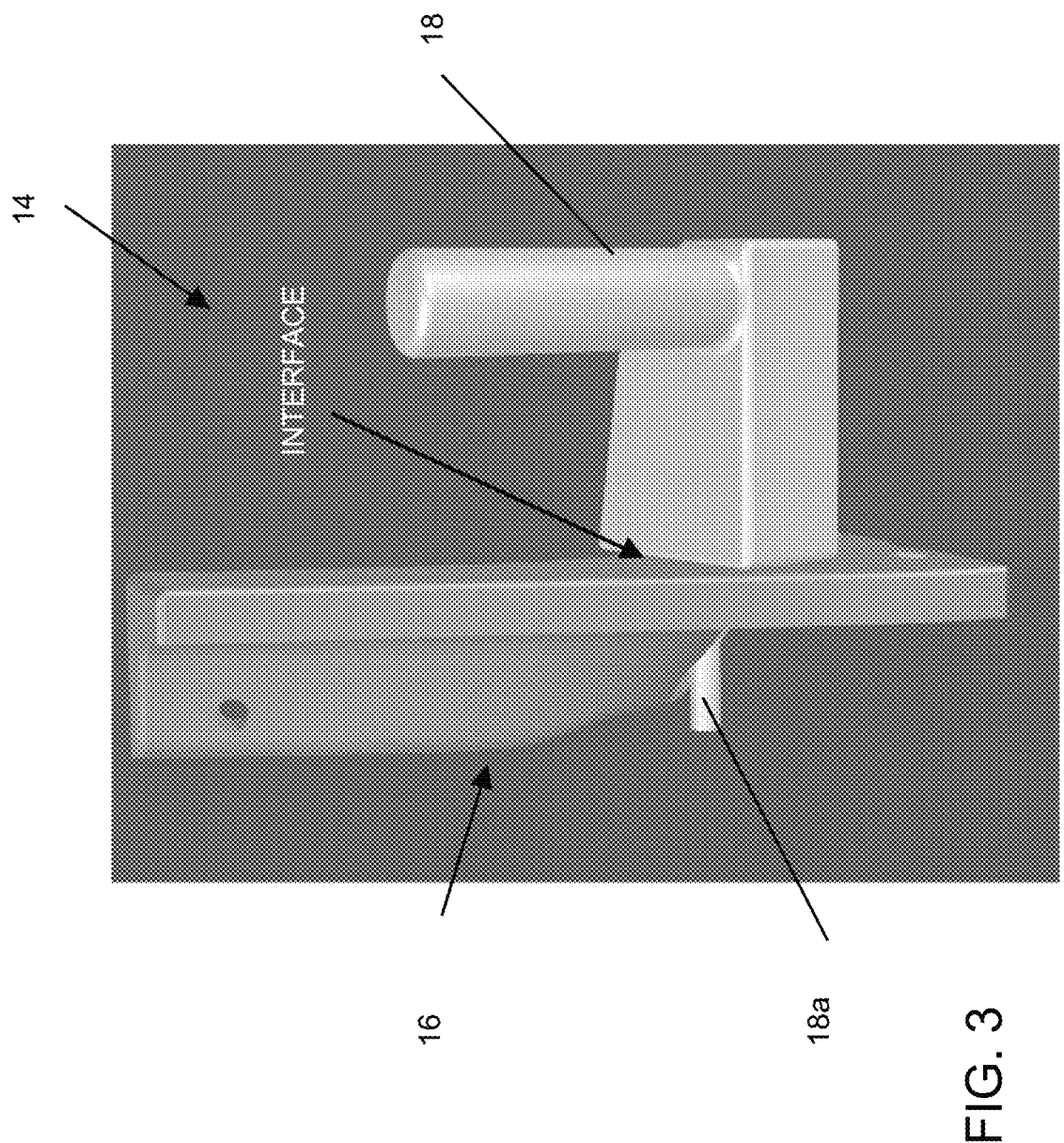
FIG. 3 is an end view of the slider door handle assembly.
Figure 4:
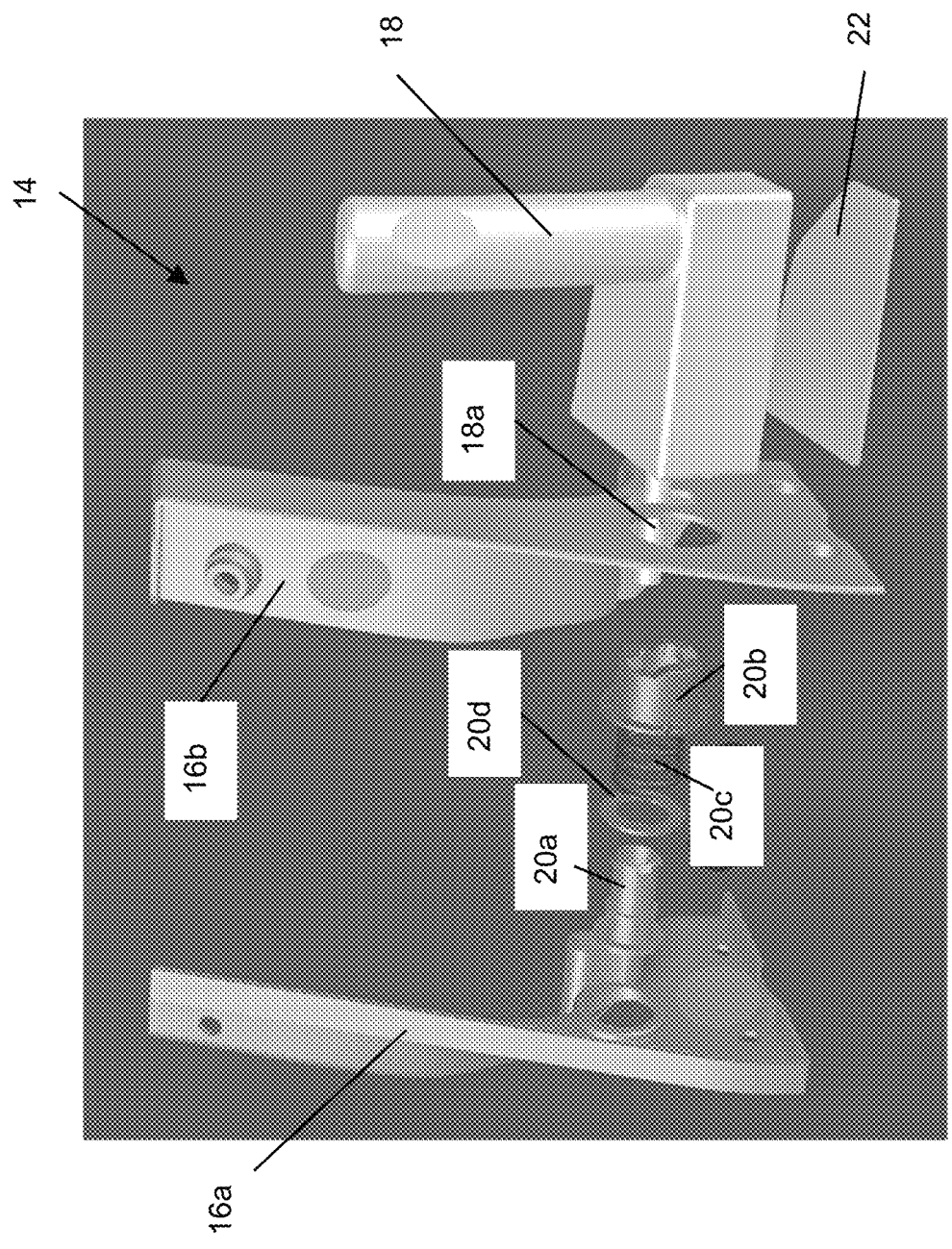
FIG. 4 is an exploded perspective view of the slider door handle assembly.
Figure 5:
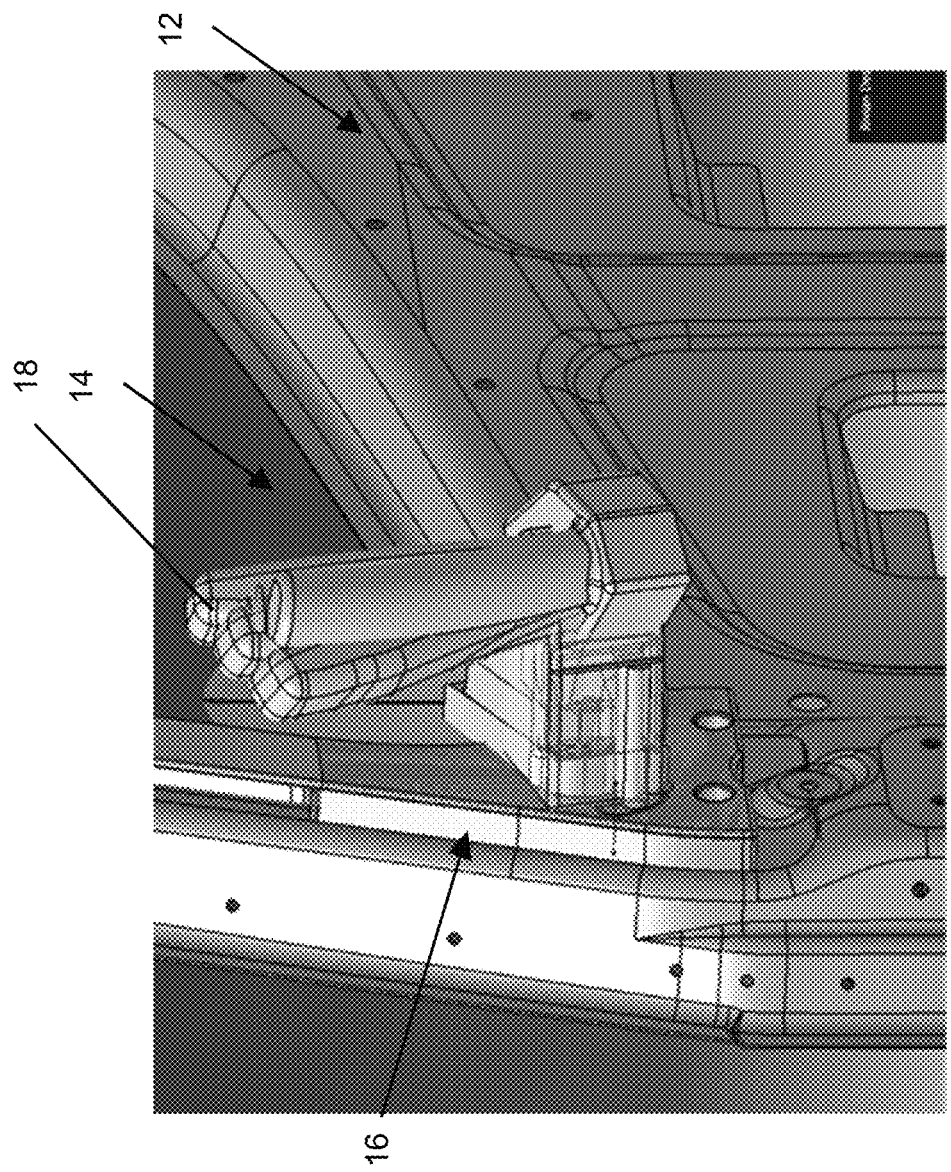
FIG. 5 is a perspective view showing the slider door handle assembly mounted at an interior side of a vehicle door.
Figure 6:
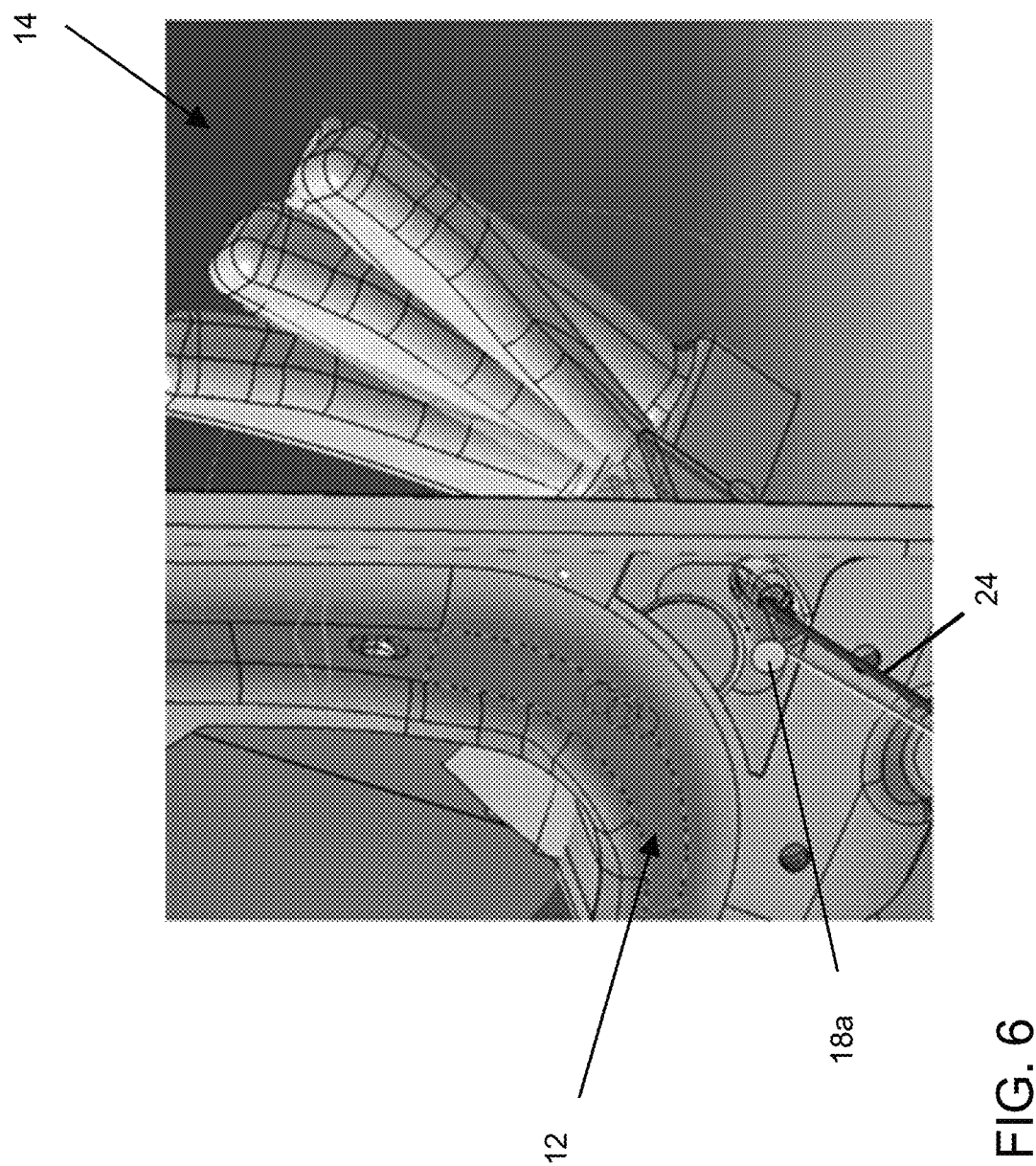
FIG. 6 is another perspective view of the slider door handle assembly mounted at the interior side of the vehicle door, showing actuation of a door latch or control mechanism via pivotal movement of the interior handle of the slider door handle assembly.
Figure 7:
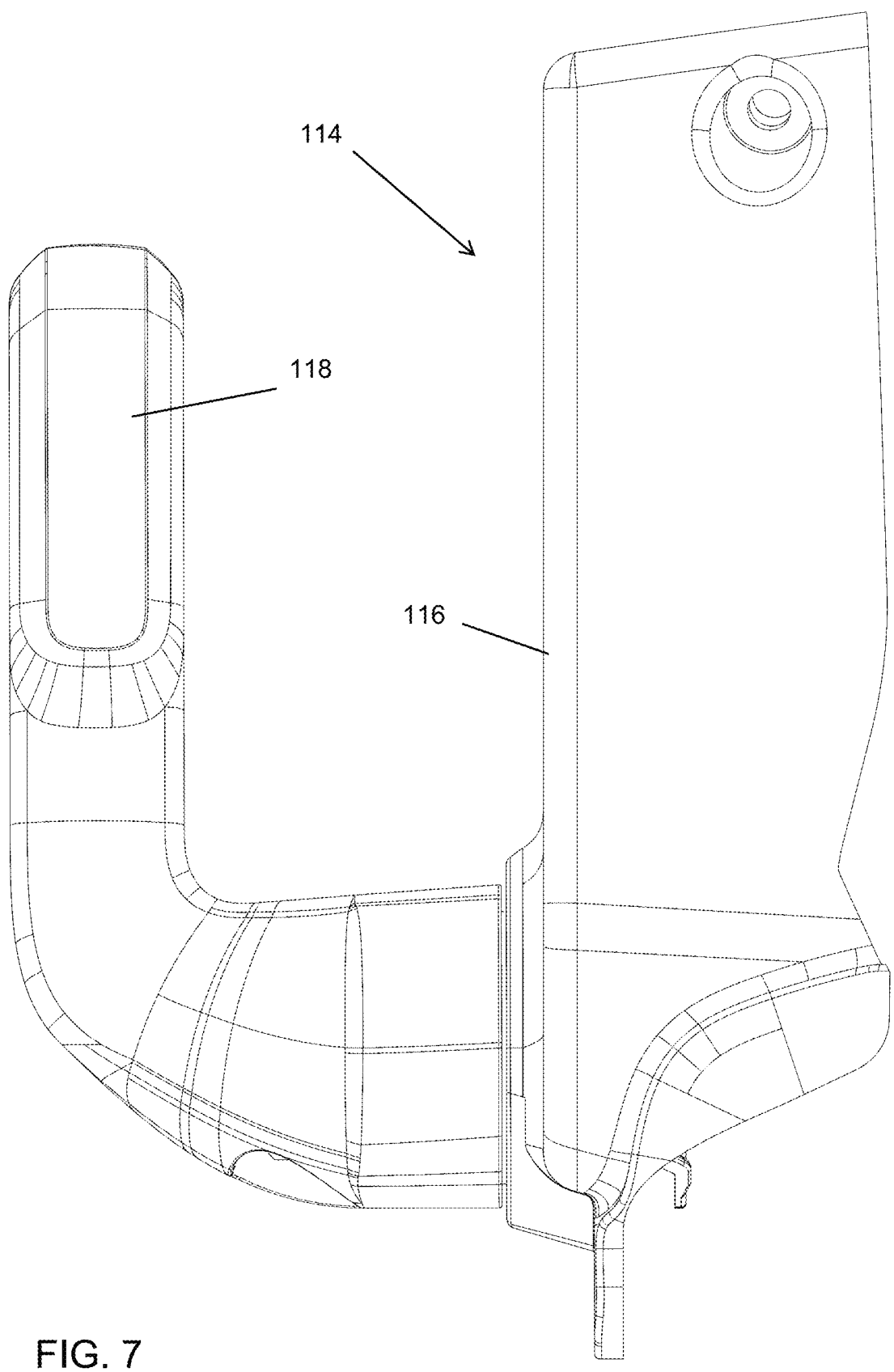
FIG. 7 is a side view of another slider door handle assembly.
Figure 8:
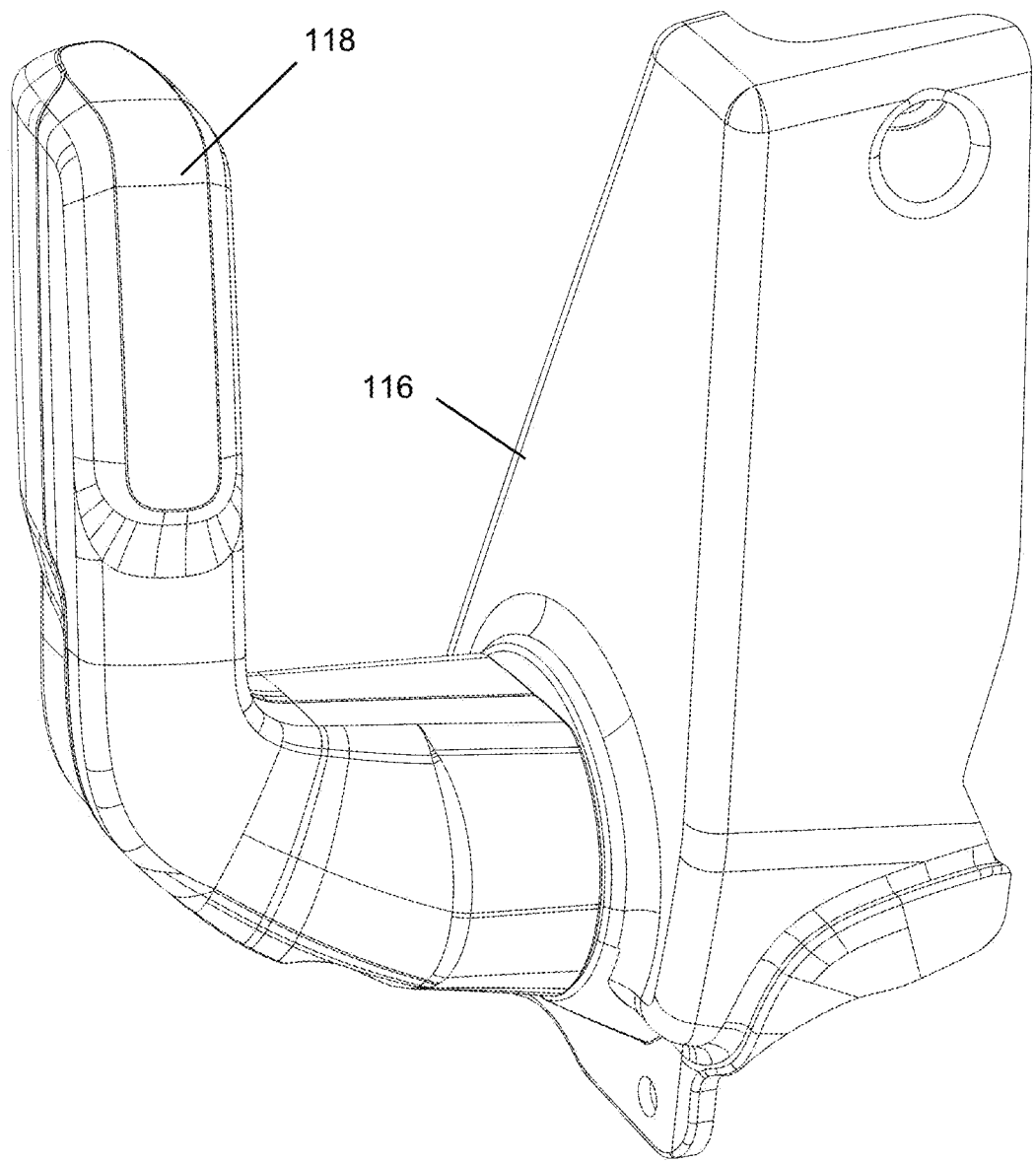
FIGS. 8 and 9 are perspective views of the slider door handle assembly of FIG. 7.
Figure 9:
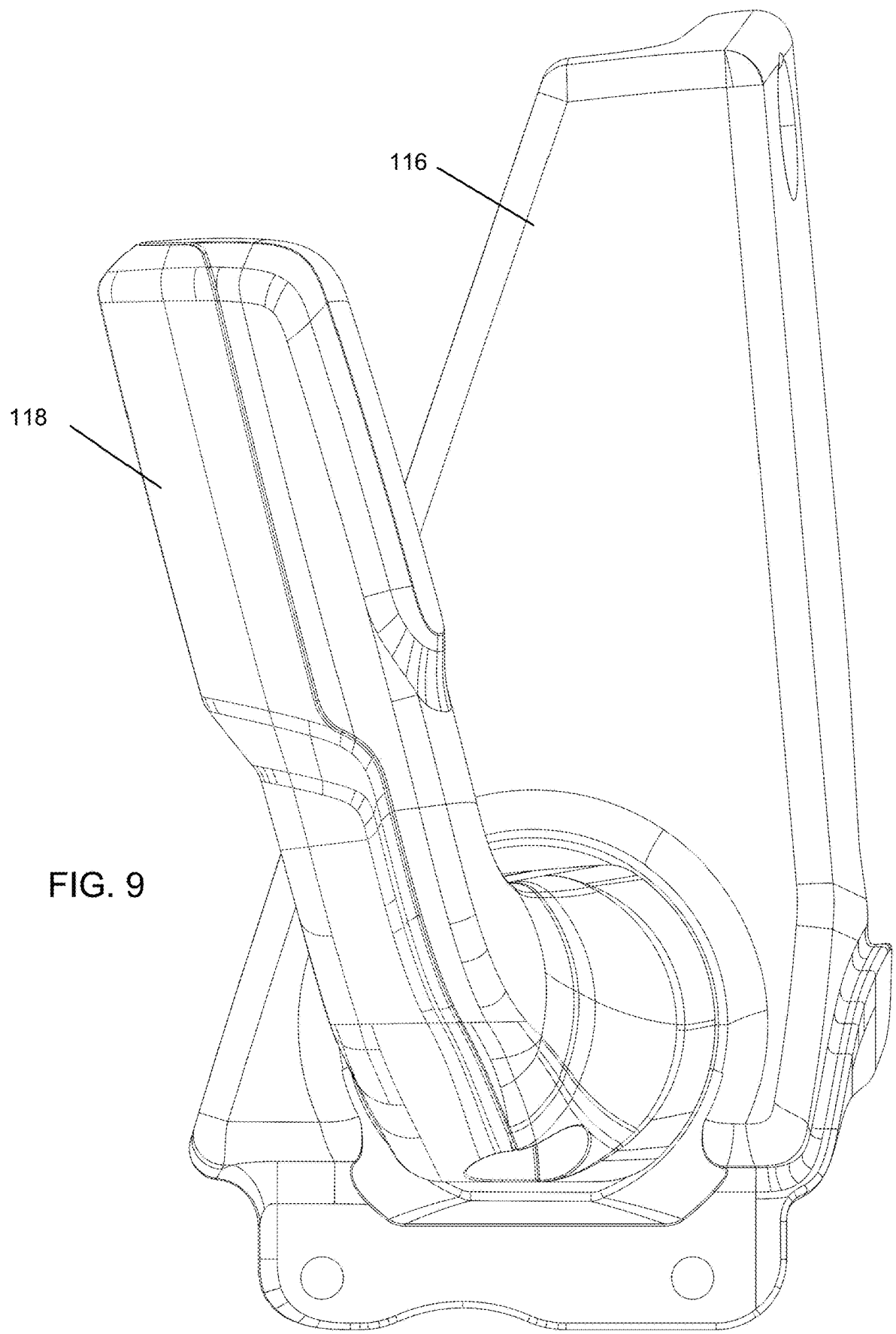
Figure 10:
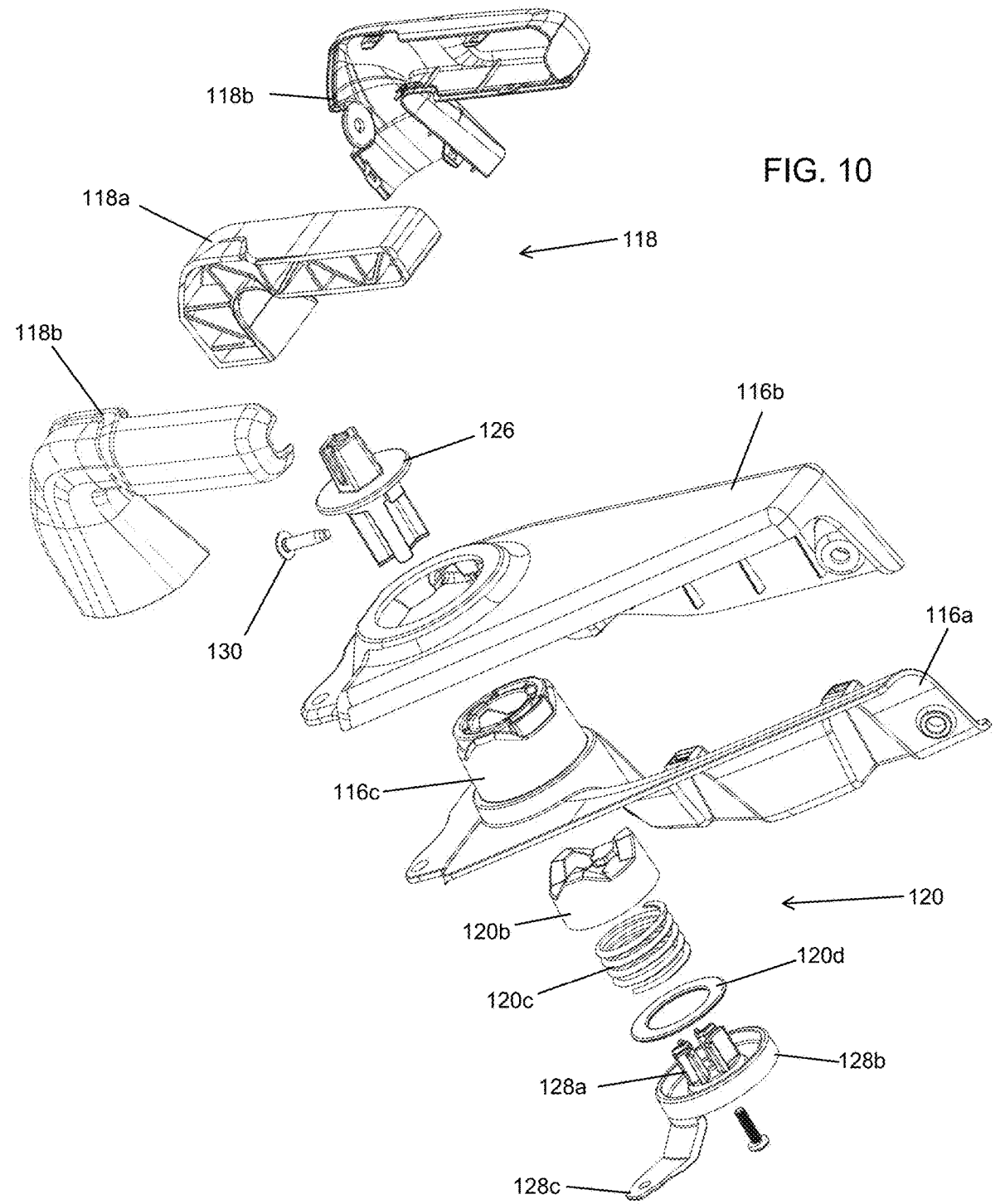
FIGS. 10 and 11 are exploded perspective views of the slider door handle assembly of FIG. 7.
Figure 11:
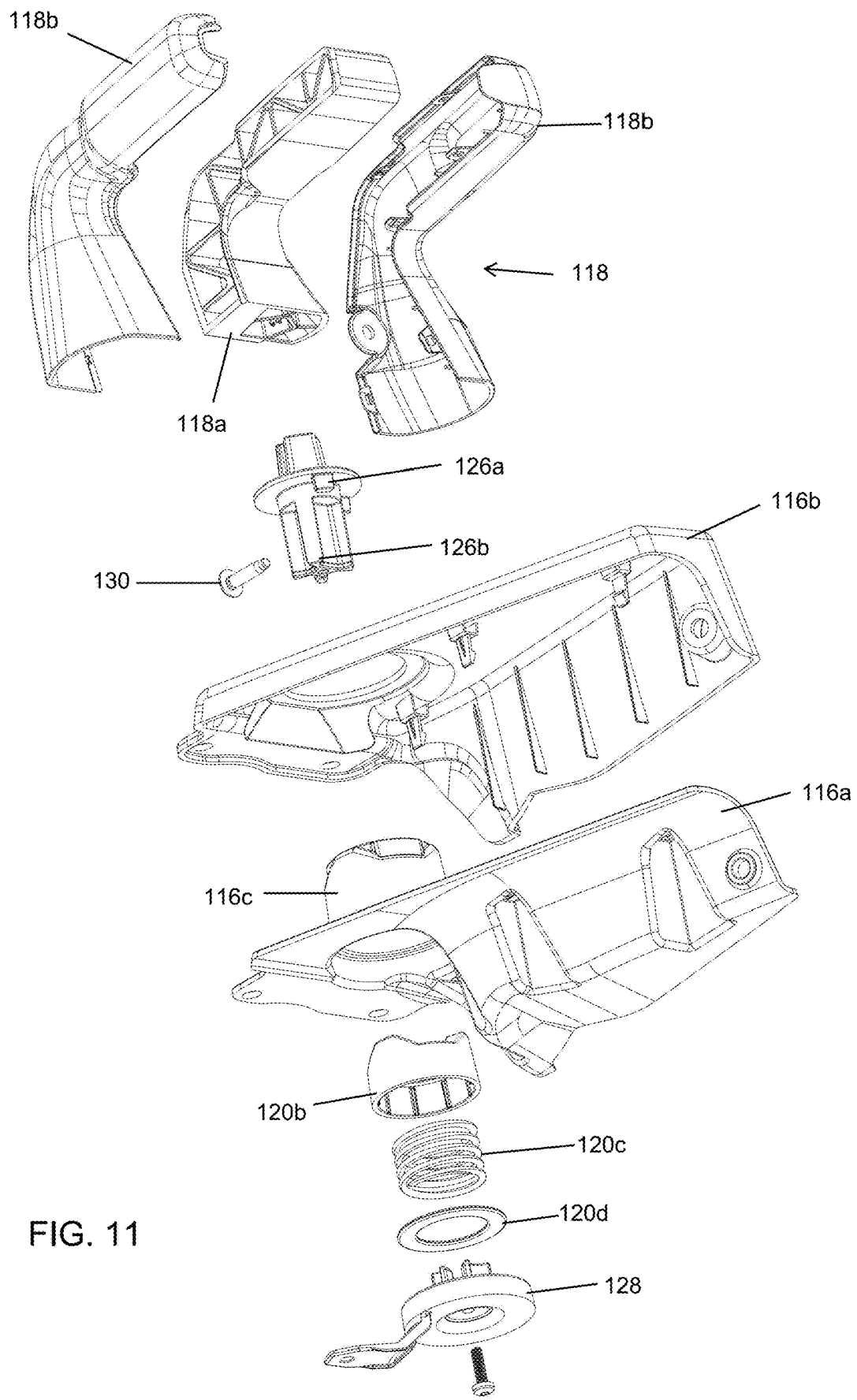
Figure 12:
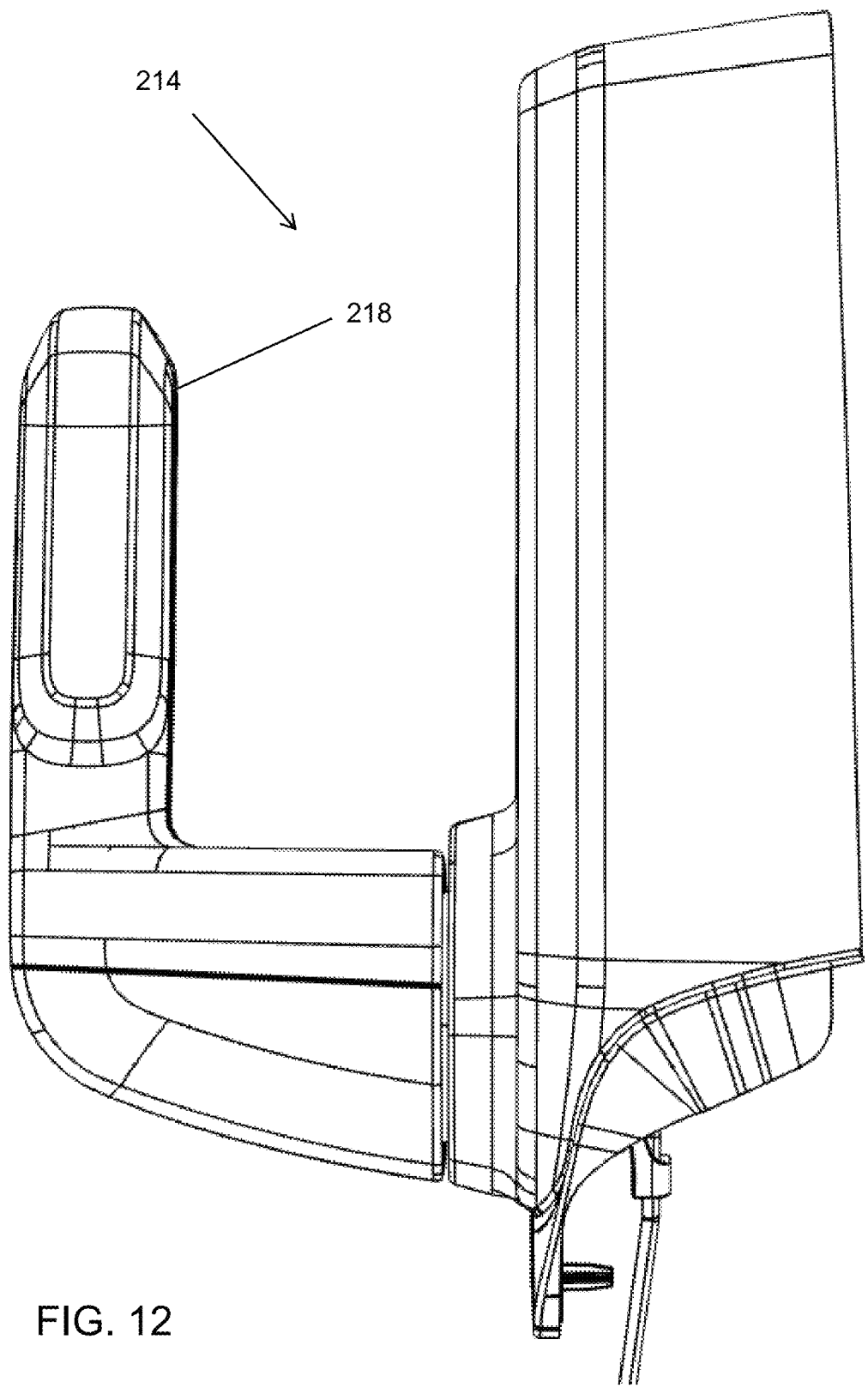
FIG. 12 is a side view of another slider door handle assembly.
Figure 13:
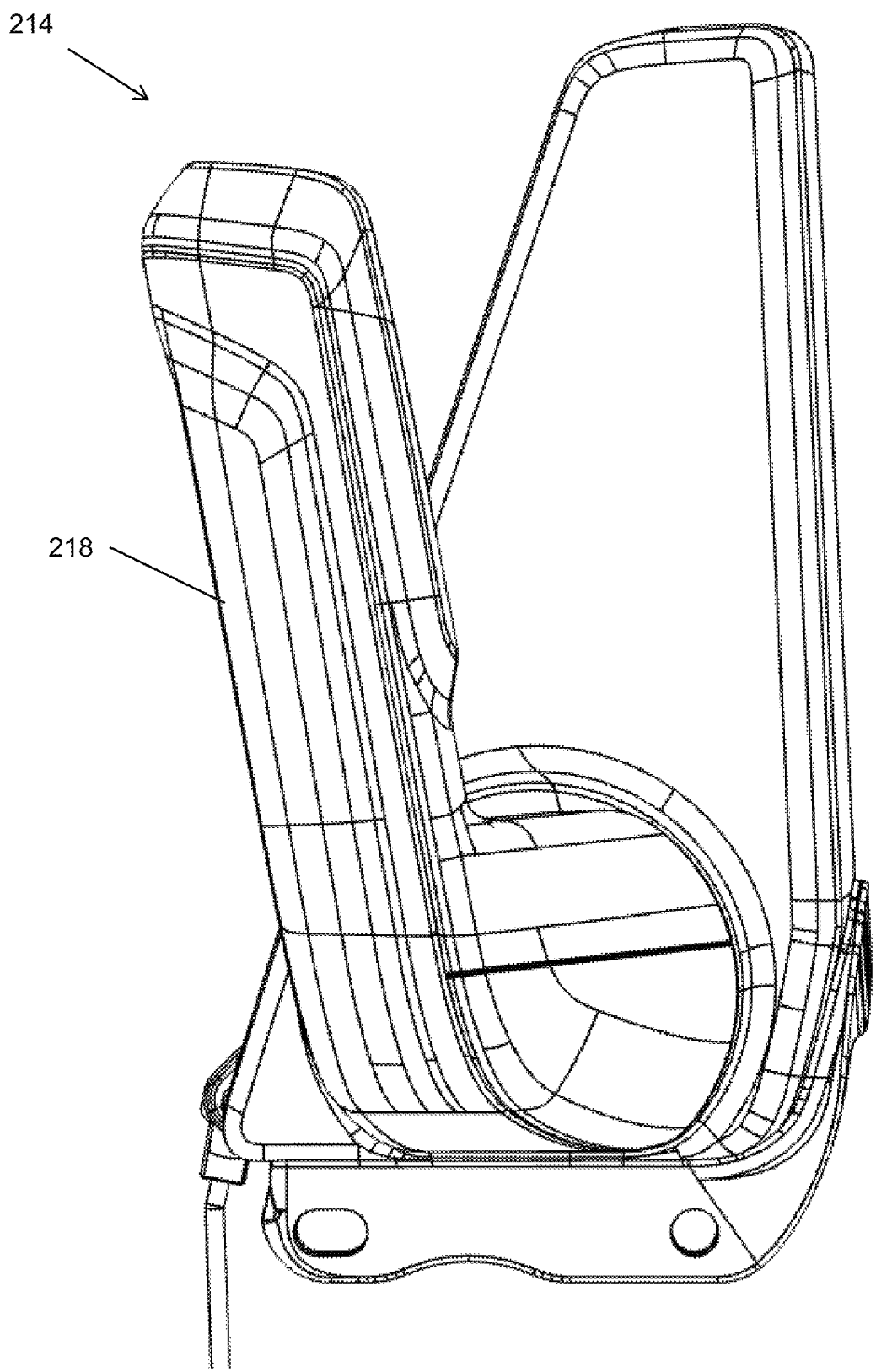
FIGS. 13 and 14 are perspective views of the slider door handle assembly of FIG. 12.
Figure 14:
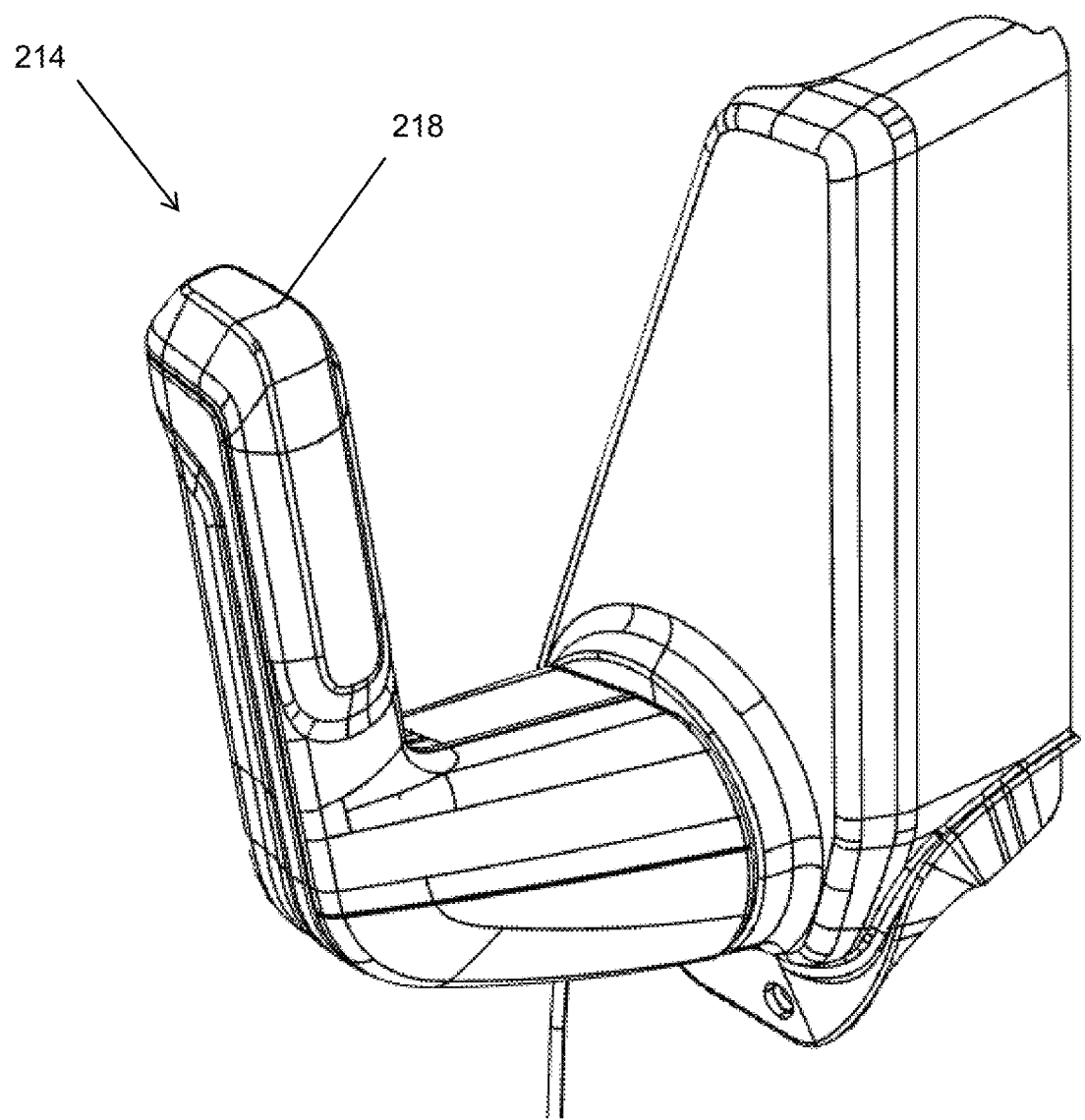
Figure 15:
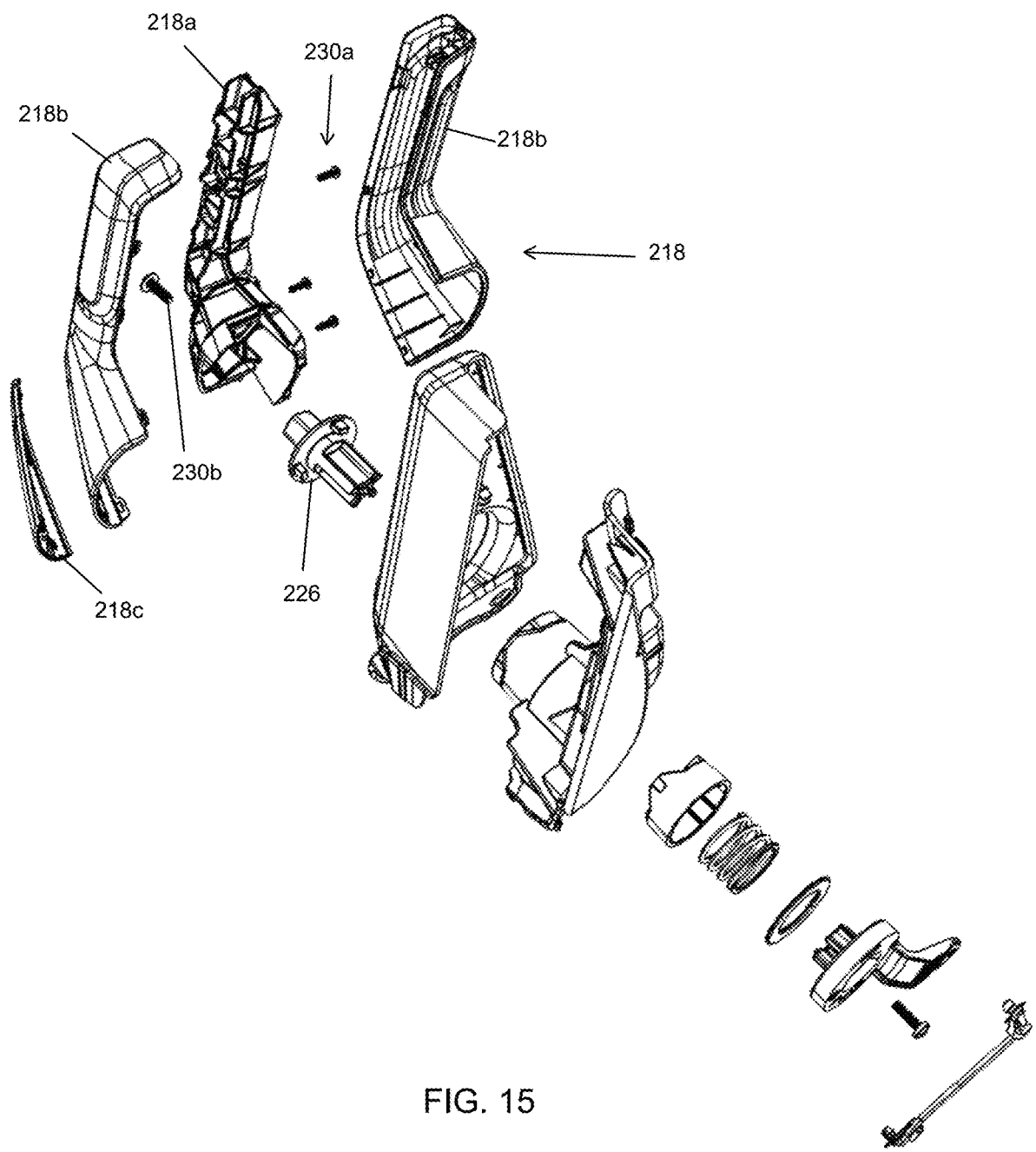
FIG. 15 is an exploded perspective view of the slider door handle assembly of FIG. 12.

Referring now to the drawings and the illustrative embodiments depicted therein, a vehicle 10 includes a side slider door 12 that is openable and closable at the side of the vehicle (FIG. 1). A slider door handle assembly 14 is disposed at an interior side or in-cabin side of the door 12 and operates to open and close the vehicle door. As shown in FIGS. 2-4, the slider door handle assembly 14 includes a base portion 16 that mounts at the vehicle door 12 and a handle portion or interior handle 18 that is pivotally mounted at the base portion 16 and pivots to actuate a door mechanism 24. The door mechanism 24 may comprise a cable or rod or linkage or micro switch that is moved via pivotal movement of the interior handle 18, such as to release a latch mechanism of the door (to allow a user to open the door) or to actuate a powered door mechanism to open the door (FIGS. 5 and 6).

The slider door handle assembly 14 includes a detent mechanism 20 that allows for pivotal movement of the interior handle 18 relative to the base portion 16 while maintaining the handle against the base portion 16, or optionally door trim disposed between the base portion 16 and interior handle 18. In other words, the detent mechanism 20 enables rotation or pivoting of the interior handle 18 relative to the base portion 16, and the spatial relationship between the interior handle 18 and base portion 16 (i.e., the engagement or space between the handle and base portion) does not substantially change as the interior handle 18 rotates or pivots relative to the base portion 16. The detent mechanism 20, when the interior handle 18 is rotated or pivoted relative to a neutral position, urges or biases the interior handle 18 toward the neutral position. As shown in FIG. 4, the detent mechanism 20 includes a pivot tube 20a that is attached at an inner part or element or plate 16a (that is disposed at least in part in the vehicle door when the slider door handle assembly is installed at the vehicle door) of the base portion 16, a detent plate or element 20b that is disposed at the pivot tube 20a (such as non-rotatably and axially movably disposed at the pivot tube), and a spring or biasing element 20c that is disposed at the pivot tube 20a and that biases or urges the detent element 20b toward the outer end of the pivot tube 20a and so that the detent element 20b protrudes partially through an aperture of an outer part or element or plate 16b of the base portion 16. As shown in FIG. 4, the detent mechanism 20 may also include a washer 20d disposed between a base portion of the pivot tube 20a and the end of the spring 20c.

The interior handle 18 is pivotally mounted at the detent mechanism 20 and includes an engaging portion that engages the outer end of the detent element 20b. The interior handle 18 includes a pin or actuating element 18a that is received through the base portion 16 and that engages or connects to the door actuating element 24 (such as a cable or rod or linkage or micro switch) of the vehicle door (see FIG. 6). The pivotal motion of the handle 18 relative to the base portion 16 translates movement to the rod/cable/micro switch to activate the door latch or mechanism. The interior handle 18 may include a cover or panel 22 at its lower side to allow access to the internal cavity of the handle, such as for aligning and connecting the interior handle at the base portion when the base portion is attached at the vehicle door.

As can be seen with reference to FIG. 4, the pivot tube 20a may be mounted at the inner portion or element 16a of the base 16, and the pivot tube 20a and detent element 20b may protrude partially through an aperture of the outer portion or element 16b of the base 16 so as to be partially received at the interior handle 18. The interior handle 18 pivotally mounts at the pivot tube 20a, with the detent element 20b (that is non-rotatable and axially movable relative to the pivot tube) allowing for pivotal movement of the handle 18 about the pivot tube 20a (and about a longitudinal axis of the pivot tube) and biasing the handle 18 towards its neutral position, without axial movement of the interior handle during the pivotal movement.

For example, and as described further below, the detent element 20b may include an engagement surface that engages a portion of the interior handle 18. When the interior handle 18 is rotated or pivoted about the pivot tube 20a, the engagement of the engagement surface with the interior handle 18 causes the detent element 20b to press or bias against the biasing element 20c and move longitudinally along the pivot tube 20a. The biasing element 20c biases the detent element 20b back toward the handle 18 and the engagement of the engagement surface of the detent element 20b guides the handle 18 toward its neutral position. Although shown and described as having the detent mechanism 20 mounted at the base portion 16, it is envisioned that the interior handle may house the detent mechanism (with the pivot tube attached at and within the interior handle), with the end of the detent element engaging a detent-engaging surface of the base portion, and with the detent element being urged axially toward and into the interior handle when the handle is rotated, so that the handle can rotate or pivot without axially moving relative to the base portion and door trim.

The interior handle 18 is pivotable in either direction (e.g., rearward to open the door and forward to close the door), and during rotation or pivoting of the handle 18, the detent element 20b is urged against the spring 20c so that the detent element 20b moves further into the door to allow the handle 18 to pivot to the next detent position, such that the handle does not move away from the base portion and door trim as it pivots. The detent mechanism is partially disposed inside the base portion of the assembly and inside the vehicle door, so the handle does not move away from the door trim piece during movement. The handle 18 pivots or rotates about its center axis to arcuately move the actuating element 18a through and along a slot of the base portion to actuate or trigger the cable or rod or linkage or micro switch of the vehicle door.

The detents of the detent element and of the door handle are designed with ramps and flats that allow the door handle to pivot in either direction (causing the detent element to move axially inward in the base portion) and to return to its initial position when released. For example, the detent element may have a pair of flat portions with oppositely sloped ramps at either side of each flat portion, while the engaging portion of the handle has a pair of flattened protrusions with oppositely sloped ramps at either side of each flat protrusion. When the handle is in its non-actuated or neutral position, the flattened protrusions are nested in the detent element, with the sloped ramps of the handle engaging the sloped ramps of the detent element. As the handle is pivoted in either direction, the detent element is urged inward by the sloped ramps to allow the handle to pivot without having to move axially outward from the base portion and door trim. When the handle is released, the sloped ramps and the spring force cooperate to urge the handle back to its initial or neutral position.

Thus, the base portion of the slider door handle assembly is mounted at the vehicle door and the handle is mounted at the base portion so that a door-facing surface of the handle engages the interior trim of the door. The door-facing surface and door trim cooperate with one another to provide a relatively tight (gapless or with a small gap) interface that is maintained (via the movement of the detent element inside the base portion) throughout the range of pivotal movement of the handle relative to the base portion.

Optionally, a slider door handle assembly 114 may include an interior handle 118 that is pivotally mounted at a base portion 116 and that engages a detent mechanism 120 via an engaging portion or element 126 of the handle 118. The engaging element 126 is fixedly attached or received (or optionally integrally formed) at the handle 118 and protrudes through the aperture in the base portion 116 so that rotational or pivotal movement of the handle 118 relative to the base portion results in corresponding movement of the engaging element 126. The engaging element 126 includes detent engaging elements or portions 126a that engage the detent element 120 to provide the detent function of the door handle assembly 114, and includes pivot engaging elements or portions 126b that engage a pivoting member 128 within or behind the base portion 116. Pivot engaging elements 126b of the engaging element 126 are keyed to protrusions 128a of the pivoting member 128 so that the pivoting member pivots according to movement of the handle 118. A base portion 128b of the pivoting member 128 may include a tab or connecting element 128c that connects to a door actuating element (such as a cable or rod or linkage or micro switch) of the vehicle door so that movement of the handle 118 translates to pivoting of the connecting element 128c to operate the door actuating element. The engaging element 126 may be axially fixed to the pivoting member 128, such as via a threaded fastener or screw.

Similar to the detent function discussed above, the detent engaging portions 126a of the engaging element 126 engage the detent element 120b. The detent assembly 120 includes a spring or biasing element 120c disposed between the detent element 120b and the pivoting member 128 to urge or bias the detent element into engagement with the engaging element 126. A washer 120d may be disposed between the spring 120c and the pivoting member 128. The detent mechanism 120 is housed behind or within the inner base element 116a, which includes a protrusion or housing portion 116c to accommodate the detent mechanism 120. The outer base element 116b may provide an outer surface or cover for the door handle assembly 114, and the engaging element 126 protrudes through the aperture in the outer base element 116b and the aperture at the housing portion 116c to engage the detent mechanism 120 and pivoting member 128 behind or within the inner base portion 116a. Optionally, the housing portion 116c may protrude through the aperture in the outer base portion 116b to be received within the handle 118.

As briefly discussed above, the engaging element 126 of the handle 118 may be fixedly attached to or integrally formed with the handle 118 in any suitable manner so that pivotal motion of the handle 118 (such as by a user to open or close the door) may translate to pivotal motion of the engaging element 126. In the illustrated example, the engaging element 126 is received or attached (such as snap-attached or press fit) at an inner or core portion 118a of the handle 118 and an outer or shell portion 118b attaches at and/or encases the core portion 118a and at least a portion of the engaging element 126. The shell portion 118b comprises two halves or parts that snap attach to each other around the core portion 118a. One or more fasteners 130 may engage the engaging element 126, the core portion 118a and both halves of the shell portion 118b to secure the handle 118 to the engaging element 126.

Optionally, and such as shown in FIGS. 12-15, a slider door handle assembly 214 may include an interior handle 218 where the shell portion 218b is separately secured to the core portion 218a via one or more first fasteners 230a and the engaging element 226 is secured to the core portion 218a via one or more second fasteners 230b. For example, a first half of the shell portion 218b may be secured to the core portion 218a via the first fasteners 230b and the second half of the shell portion 218b may snap attach to the first half. A cover portion 218c may attach at the shell portion 218b of the handle 218 to hide or cover the fasteners at the assembled handle assembly 214.

The door handle assembly 114 and/or the door handle assembly 214 may control operation of the slider door of the vehicle and include further components similar to the door handle assembly 14, such that a detailed discussion of the door handle assemblies need not be repeated herein.

Optionally, the protrusions of the pivoting member are pivotable relative to the base so that, when the handle and engaging element are pivoted relative to the base portion, the protrusions pivot according to the pivoting of the handle and engaging element while the base remains fixed. In such implementations, the door actuating element may be connected to the engaging element, detent assembly, pivoting member or any other component of the handle assembly in any suitable manner so that pivotal movement of the handle results in operation of the slider door of the vehicle.

The detent mechanism may utilize aspects of an exterior rearview mirror assembly pivot and detent feature. For example, the detent mechanism may utilize aspects of the mirror detents and actuators described in U.S. Pat. Nos. 7,887,202 and/or 9,487,142, and/or U.S. Publication Nos. US-2020-0353867 and/or US-2020-0223364, and/or PCT Application No. PCT/US21/70765, filed Jun. 24, 2021, and/or U.S. provisional application Ser. No. 63/202,633, filed Jun. 18, 2021, which are all hereby incorporated herein by reference in their entireties.

Optionally, aspects of the present disclosure may be compatible with a slider door handle assembly disposed at an exterior side of a vehicular door. For example, the base portion may mount at the vehicle door and the exterior handle portion may be pivotally mounted at the base portion and exposed exterior the vehicle so that a user may grasp and pivot the handle portion relative to the door and base portion such as to actuate a latch mechanism and open or close the door from exterior the vehicle. The detent mechanism may maintain the handle against the base portion or a portion of the door between the handle and the base portion (such as a door panel or door pocket or the like), such as to preclude moisture from entering the door handle assembly. Optionally, a seal or gasket may be disposed at the interface between the handle and the base portion (or portion of the door).

Changes and modifications to the specifically described embodiments may be carried out without departing from the principles of the present invention, which is intended to be limited only by the scope of the appended claims as interpreted according to the principles of patent law.

The invention claimed is:

1. A vehicular slider door handle assembly, the vehicular slider door handle assembly comprising:
    a base portion configured for mounting at a vehicular slider door;
    a handle pivotally mounted at the base portion;
    a detent mechanism, wherein the detent mechanism comprises a pivot tube mounted at the base portion;
    wherein the handle is pivotally mounted at the pivot tube, and wherein the handle is pivotable relative to the base portion about a pivot axis of the detent mechanism, and wherein the pivot axis of the detent mechanism comprises a longitudinal axis of the pivot tube, and wherein the handle is pivotable between a neutral position and a door opening position;
    wherein the detent mechanism releasably retains the handle relative to the base portion at the neutral position; and
    wherein, with the base portion mounted at the vehicular slider door, and as the handle pivots about the pivot axis via actuation by a person at the vehicular slider door, the detent mechanism allows the handle to pivot relative to the base portion from the neutral position toward the door opening position without axially moving the handle along the pivot axis away from the base portion.

2. The vehicular slider door handle assembly of claim 1, wherein the detent mechanism comprises (i) a detent element disposed at the base portion and (ii) a detent-engaging part of the handle, and wherein the detent-engaging part of the handle engages the detent element.

3. The vehicular slider door handle assembly of claim 1, wherein the base portion is configured for mounting at an interior side of the vehicular slider door, and wherein the handle comprises an interior handle.

4. The vehicular slider door handle assembly of claim 1, wherein the base portion is configured for mounting at an exterior side of the vehicular slider door, and wherein the handle comprises an exterior handle.

5. A vehicular slider door handle assembly, the vehicular slider door handle assembly comprising:
    a base portion configured for mounting at a vehicular slider door;
    a handle pivotally mounted at the base portion;
    a detent mechanism;
    wherein the handle is pivotable relative to the base portion about a pivot axis of the detent mechanism, and wherein the handle is pivotable between a neutral position and a door opening position;
    wherein the detent mechanism releasably retains the handle relative to the base portion at the neutral position;
    wherein, with the base portion mounted at the vehicular slider door, and as the handle pivots about the pivot axis via actuation by a person at the vehicular slider door, the detent mechanism allows the handle to pivot relative to the base portion from the neutral position toward the door opening position without axially moving the handle along the pivot axis away from the base portion;
    wherein the detent mechanism comprises (i) a detent element disposed at the base portion and (ii) a detent-engaging part of the handle, and wherein the detent-engaging part of the handle engages the detent element;

wherein the detent element and the detent-engaging part of the handle cooperate to releasably retain the handle at the neutral position; and wherein the detent mechanism comprises a pivot tube mounted at the base portion, and wherein the handle is pivotally mounted at the pivot tube and is pivotable about a longitudinal axis of the pivot tube.

6. The vehicular slider door handle assembly of claim 5, wherein the detent element is non-rotatably disposed at and is axially movable along the pivot tube and is biased toward the detent-engaging part of the handle via a biasing element disposed at the pivot tube.

7. The vehicular slider door handle assembly of claim 6, wherein, as the handle pivots about the pivot axis from the neutral position toward the door opening position, the detent element moves inward toward the base portion to allow the handle to pivot relative to the base portion without axially moving the handle away from the base portion.

8. A vehicular slider door handle assembly, the vehicular slider door handle assembly comprising:
- a base portion configured for mounting at an interior side of a vehicular slider door;
- an interior handle pivotally mounted at the base portion;
- a detent mechanism, wherein the detent mechanism comprises a pivot tube mounted at the base portion;
- wherein the interior handle is pivotally mounted at the pivot tube, and wherein the interior handle is pivotable relative to the base portion about a pivot axis of the detent mechanism, and wherein the pivot axis of the detent mechanism comprises a longitudinal axis of the pivot tube, and wherein the interior handle is pivotable between a neutral position and a door opening position;
- wherein the detent mechanism comprises (i) a detent element disposed at the base portion and (ii) a detent-engaging part of the interior handle, and wherein the detent-engaging part of the interior handle engages the detent element;
- wherein the detent element and the detent-engaging part of the interior handle cooperate to releasably retain the interior handle relative to the base portion at the neutral position; and
- wherein, with the base portion mounted at the interior side of the vehicular slider door, and as the interior handle pivots about the pivot axis via actuation by a person at the vehicular slider door, the detent mechanism allows the interior handle to pivot relative to the base portion from the neutral position toward the door opening position without axially moving the interior handle along the pivot axis away from the base portion.

9. The vehicular slider door handle assembly of claim 8, wherein the detent element is non-rotatably disposed at and is axially movable along the pivot tube and is biased toward the detent-engaging part of the interior handle via a biasing element disposed at the pivot tube.

10. The vehicular slider door handle assembly of claim 9, wherein, as the interior handle pivots about the pivot axis from the neutral position toward the door opening position, the detent element moves inward toward the base portion to allow the handle to pivot relative to the base portion without axially moving the interior handle away from the base portion.

* * * * *